(12) United States Patent
Fisher (10) Patent No.: US 9,439,362 B2
(45) Date of Patent: Sep. 13, 2016

(54) SYSTEM AND METHOD FOR GROWING PLANTS

(75) Inventor: Alexander P. Fisher, Birmingham (GB)

(73) Assignee: Alexander P Fisher, Birmingham ( * ) Notice: Subject to any disclaimer, the term of this patent is extended or adjusted under 35 U.S.C. 154(b) by 451 days.

(21) Appl. No.: 13/810,681

(22) PCT Filed: Jul. 18, 2011

(86) PCT No.: PCT/GB2011/051346
§ 371 (c)(1),
(2), (4) Date: Jan. 17, 2013

(87) PCT Pub. No.: WO2012/010876
PCT Pub. Date: Jan. 26, 2012

(65) Prior Publication Data
US 2013/0111812 A1   May 9, 2013

(30) Foreign Application Priority Data

Jul. 19, 2010 (GB) .................................. 1012087.1

(51) Int. Cl.
*A01G 9/02* (2006.01)
(52) U.S. Cl.
CPC ............... *A01G 9/022* (2013.01); *A01G 9/023* (2013.01)
(58) Field of Classification Search
CPC ...... A01G 9/022; A01G 9/023; A01G 9/246; A01G 31/06; A01G 31/08; A01G 31/00; A01G 31/02; A01G 31/04; A01G 31/045; A01G 31/047; A01G 29/00
USPC .............................. 47/82, 83, 66.7, 62 A, 79
See application file for complete search history.

(56) References Cited

U.S. PATENT DOCUMENTS

| 3,452,475 A * | 7/1969 | Johnson Sr. ...................... 47/82 |
| 4,216,617 A * | 8/1980 | Schmidt ................. A01G 31/06 47/62 A |
| 4,594,811 A * | 6/1986 | Tokoro .............................. 47/65 |
| 4,825,592 A * | 5/1989 | Earls ..................... A01G 9/122 47/82 |
| 5,404,672 A * | 4/1995 | Sanderson ............. A01G 9/023 47/39 |
| 5,440,836 A * | 8/1995 | Lee ................................. 47/60 |

(Continued)

FOREIGN PATENT DOCUMENTS

| AU | 586493 B2 | 7/1989 |
| CN | 2083844 U | 9/1991 |

(Continued)

OTHER PUBLICATIONS

PCT International Search Report prepared by the EPO in PCT Application No. PCT/GB2011/051346, dated Oct. 20, 2011.

(Continued)

*Primary Examiner* — Joshua Huson (57) ABSTRACT

This invention concerns apparatus for growing plants comprising a column (100) of pots (102) stacked one above the other to define an enclosure for housing plants. Each pot (102) defines a chamber (104) for holding a plant. Separators for separating pots of the column are provided and the separators define an enclosed headspace around a top of at least two of the pots where plants project from the chamber. The chamber comprises a passageway (106) that provides a continuous flow path for air through the column (100) without requiring the air to flow through the chamber (104). This flow path includes the headspaces above the at least two of the pots (102).

14 Claims, 5 Drawing Sheets

(56) References Cited

U.S. PATENT DOCUMENTS

| | | | |
|---|---|---|---|
| 5,555,676 A | 9/1996 | Lund | |
| 6,502,350 B1* | 1/2003 | Dick | 47/62 R |
| 6,612,073 B1* | 9/2003 | Powell et al. | 47/83 |
| 6,840,008 B1 | 1/2005 | Bullock et al. | |
| 2002/0129551 A1* | 9/2002 | Kemp | A47F 7/0078 47/83 |
| 2003/0089037 A1 | 5/2003 | Ware | |
| 2006/0032128 A1* | 2/2006 | Bryan, III | A01G 31/06 47/62 R |
| 2006/0156624 A1 | 7/2006 | Roy et al. | |
| 2010/0072102 A1* | 3/2010 | Jung | 206/503 |
| 2010/0132255 A1* | 6/2010 | Webber | A01G 9/023 47/29.1 |
| 2010/0146854 A1* | 6/2010 | Cannon | A01G 9/023 47/82 |
| 2011/0000132 A1* | 1/2011 | Kamau | A01G 9/02 47/66.6 |
| 2011/0061297 A1* | 3/2011 | Simmons | A01G 31/02 47/62 A |
| 2012/0279126 A1* | 11/2012 | Simmons | A01G 31/02 47/62 A |

FOREIGN PATENT DOCUMENTS

| | | |
|---|---|---|
| CN | 1913770 A | 2/2007 |
| DE | 2503758 A1 | 8/1976 |
| DE | 20014244 U1 | 2/2001 |
| DE | 20014244 U1 | 2/2001 |
| JP | 399933 U | 10/1991 |
| JP | 2001008551 A | 1/2001 |

OTHER PUBLICATIONS

Chenyan Wu, "Office Action" issued by the State Intellectual Property Office of China on Dec. 12, 2013.

Holger Oelschlager, "Written Opinion" for International Application No. PCT/GB2011/051346, publicly available via WIPO Patent Scope on Jan. 19, 2013.

* cited by examiner

SYSTEM AND METHOD FOR GROWING PLANTS

FIELD OF INVENTION

This invention concerns a system and method for growing plants. The invention has particular, but not exclusive, application to a system and method for growing plants in which airflow and temperature can be precisely regulated.

BACKGROUND

To grow plants in environments that have ambient temperatures unsuitable for the particular type of plants being grown, it is known to provide means for heating or cooling the air around the plants. For example, this may be achieved by suitably positioned heaters or by shading the plants from the glare of the sun, for example as is achieved through the use of polytunnels. A problem with known heating arrangements is that heating of the ambient air around the plants requires large amounts of energy.

It is also known to cultivate plants in a column of growing containers, examples of which can be found in U.S. Pat. No. 6,840,008B1, US2003/0089037A1, U.S. Pat. No. 5,555,676 and US2006/0156624. Water and nutrients may be fed into the columns of plants. However, there is no disclosure of how to control the temperature and flow of air around the plants.

SUMMARY OF INVENTION

According to a first aspect of the invention there is provided apparatus for growing plants comprising a column of pots stacked one above the other to define an enclosure for housing plants, each pot defining a chamber for holding a plant, separators for separating pots of the column, the separators defining an enclosed headspace around a top of each at least two of the pots where plants project from the chamber, a passageway providing a continuous flow path for air through the column without requiring the air to flow through the chamber, the flow path including the headspaces above the at least two pots such that the air can flow over the leaves and/or stems of the plants in the enclosed headspace.

Such apparatus may be advantageous as air, in particular heated or cooled air, can be introduced into the column to flow substantially unimpeded around the plants for aiding plant growth whilst the enclosure limits loss of the heated or cooled air to the outside environment as it flows through the column. In this way, the environment for the plants can be controlled in an energy efficient manner. Furthermore, it is believed the flow of air over the leaves, stems, or propagation plug in which the stems, roots, bulbs or leaves are embedded, surface of a growth substrate and/or surfaces of the apparatus may help to reduce fungal, algal and bacterial growth.

The chamber may be arranged for holding a growing substrate, such as soil/compost, rockwool or biochar, in which the plant grows.

The column may have an inlet for receiving air and may have an outlet for the removal of air from the column. An inlet and outlet allow the column to be connected to a heat exchanger for cooling/heating the air. The outlet may be located above the inlet, in particular, the inlet may be located, in use, in a lower portion of the column, such as below the lowermost pot, and the outlet located, in use, in an upper portion of the column, such as above the uppermost pot. Such an arrangement is suitable for heated air where the warm air rises to the top of the column. If cooled air is being introduced to the column, then the locations of the inlet and outlet may be reversed.

In one embodiment, each pot has a duct therein to form the passageway through the column. The duct may extend from a bottom of the pot to a location above an intended top of the growth substrate. For example, the pot may have indicia thereon identifying the intended height for the growth substrate and the duct may extend to or above that height. Alternatively, the duct may extend to the same height as a rim of the chamber. In this way, the duct cannot be blocked by filling the chamber to the top with growth substrate. Therefore a fresh, aerated environment is provided in the enclosed controlled immediate vicinity for the growing plant. It is particularly beneficial that such an aerated, yet controlled, environment is provided for the surface and/or body of the growth substrate, and the interior surfaces of the enclosure (e.g. the surfaces of the separators (in embodiments where separators are present).

The duct may be surrounded by the chamber, for example located centrally within the pot, with inner walls separating the duct from the chamber. The pot may be of circular cross-section with a radial inner wall separating the duct from the chamber. Alternatively, the duct may be defined by channels in the side of the pot, for example, in the rim of the pot.

Preferably the separators are transparent or translucent. The separators provide space between the pots for the plants to grow and may allow sunlight into the column. The separator may be integral with one of the pots or separate from the pots.

In one embodiment, at least one of or each separator comprise apertures therein through which plants can grow out from the column. Such apertures should be large enough to allow the plants to grow from the column but small enough to limit excess energy loss from the column. The apertures may be open sided apertures in a bottom of the separator located next to the pot below. A pot below a separator comprising apertures may have a curved rim. In this way, a plant growing from the aperture is not damaged or even cut by the weight of the plant pulling the plant against a rim of the pot. Furthermore, the curved rim may help to project the plant in an appropriate direction. It is believed that heating/cooling of the soil or other growth substrate is a very influential factor affecting plant growth; heating of the foliage being less influential. Therefore, it may be acceptable for the foliage to hang outside the enclosure in the cooler/hotter air external to the enclosure. In fact the foliage might be encouraged to grow outside the enclosure so that it (the foliage) effectively blocks or obstructs the aperture to further limit water loss and heat transfer (loss or gain) between the interior and the exterior of the enclosure. There is thereby provided a controlled, efficient growing system that is kept aerated in a manner which does not encourage water or heat loss/gain and that remains 'sealed' as the plant grows, and throughout the growth cycle (from being a shoot through its growth to a grown plant), without the need to re-house the plant. Energy loss is minimised by providing a suitably sized aperture for the type of plant being grown. The aperture may be sized such that the shoot or stem of the plant can fit therethrough whilst the foliage of the plant may be grown externally of the enclosure. The aperture may be small compared to the separator. For example, the aperture may be 0.5 $cm^2$ to 36 $cm^2$ in area—it may be approximately semi-circular, square or circular or arch shaped or any other suitable shape. It might be even larger or smaller for other applications (e.g. for larger crop or vine plant applications).

The column of pots may be arranged such that water evaporating from a plant and/or the growing substrate in one of the pots will condense on one of the pots above. The pots may have a lower surface shaped to cause water condensed thereon to run away from the passageway in the column. For example, in the embodiment wherein each pot has a central duct therein, the lower surface may slope downwardly, for example in a curve, in a radial direction away from a centre of the pot. In this way, water in the enclosure is not lost through evaporation to the external environment but is recovered back to the pot. Furthermore, the shape of the lower surface of the pot limits loss of water to the bottom of the column through the passageway/ducts in the pots.

The column may be arranged such that the pots can be rotated around a central axis of the column. In this way, the pots can be rotated to gain easy access to the plants, as desired and provide an even distribution of light to the plants. For example, if the intensity of light is not uniform around the enclosure the pots can be rotated such that plants that before were in low light conditions are now in bright light conditions. Rotation of the pots may be carried out automatically.

In some embodiments a growth substrate (such as soil) may not be provided in a conventional sense within the chamber.

In such an embodiment, and in other embodiments where a growth substrate is provided, the plant may be provided in the chamber within a further growth substrate, such as within a propagation plug, such as a peat plug (or any other suitable known equivalent). In such embodiments, the plant being grown may be enclosed at its base (for example, its bulb, root or stem) within the further growth substrate, such as a peat plug.

The peat plug can be positioned, in use, on the surface of the growth substrate (e.g. soil) within the chamber or plugged/planted/embedded into the growth substrate (e.g. soil) within the chamber.

The peat plug (or other further substrate) is in communication with the headspace and so aeration of the headspace causes aeration of the peat plug and its surrounding environment. As a result, fungal, algal and bacterial growth around the peat plug and growing plant is reduced and the growth of the plant is encouraged.

In some embodiments the plant grows out of the apertures 134. For example, the stems and leaves of the plant may grow out of the chamber via the aperture 134, whilst the peat plug is rooted within the enclosed headspace and/or chamber. Even though the foliage and leaves might actually grow outside the enclosure, the presence of the plug within the aerated, moist, controlled enclosure is beneficial for the growing plant. Furthermore, the plug might help by blocking the aperture to further minimise the already relatively small water/heat loss/gain from the enclosure. Where it is stated that air flows past a stem, if said stem is located within a further growth substrate (e.g. a propagation plug), then since similar benefits are achieved, as outlined above, by air flow over the further growth substrate (such as the plug), then it is intended to mean within the scope of this invention that air flows over the peat plug containing the stem.

According to a second aspect of the invention there is provided a module comprising a pot and a separator, each pot having a chamber for holding a plant, and optionally for holding a growing substrate, such as soil, rockwool or biochar, in which the plant grows, and a duct therein arranged such that air can flow through the duct without flowing through the chamber, wherein a plurality of such modules can be stacked together to form a column with the separators separating the pots of the column and defining an enclosed headspace around a top of each of at least two of the pots where plants project from the chamber and the ducts in the pots forming a continuous flow path through the column, the flow path including headspaces above the at least two pots such that the air can flow over the leaves and/or stems of the plants in the enclosed headspaces.

According to a third aspect of the invention there is provided a kit of parts for assembly into apparatus according to the first aspect of the invention.

According to a fourth aspect of the invention there is provided a method for growing plants comprising planting plants in pots, each pot defining a chamber for holding a plant, stacking the pots one above the other in a column with separators separating pots of the column and defining an enclosed headspace around a top of each of at least two of the pots where plants project from the chamber, the column comprising an air inlet and an air outlet and arranged such that air introduced to the air inlet flows to the air outlet through a passageway providing a continuous flow path through the column, without requiring the air to flow through the chamber, the flow path including the headspaces above the at least two pots such that the air can flow over the leaves and/or stems of the plants in the enclosed headspaces, and introducing air to the air inlet.

It will be understood that the term "planting plants" includes the planting of seeds, bulbs or the like.

In one embodiment, the air introduced to the air inlet is heated or cooled air. The method may comprise providing a growing substrate in the pots in which the plants grow and the continuous path for air may be arranged such that air can flow from the inlet to the outlet without passing through the growing substrate.

According to a fifth aspect of the invention there is provided a system for growing plants comprising, apparatus according to the first aspect of the invention, a supply conduit for supplying air to the enclosure and a return conduit for recovering air from the apparatus and a heat exchanger for heating or cooling the air, the supply conduit arranged to supply air from the heat exchanger to the inlet and the return conduit arranged to return air from the apparatus to the heat exchanger. The air inlet may be vertically spaced from an air outlet.

The system provides a flow of air past the plants that may facilitate plant growth. The flow of air over the leaves, stems, surface of a growth substrate and/or surfaces of the enclosure may help to reduce fungal, algal and bacterial growth and augment plant growth.

Such a system may provide an efficient way of heating or cooling plants relative to heating a larger volume of air in an enclosure with heating or cooling means. In particular, the apparatus may provide a headspace above the pots that is of the order of the size of the plants being grown. In one embodiment, the enclosure may have a width of 1 m or less, preferably 400 mm or less and most preferably, around 150 mm. The headspace above each pot may be less than 1 m, preferably less than 500 mm and most preferably less than 200 mm. The heating of air in such a small space is much more efficient than heating plants in large greenhouses.

The system may comprise a plurality of apparatus, wherein the length of the supply conduit from the heat exchanger to the apparatus plus the length of the return conduit from the apparatus to the heat exchanger is substantially the same for each apparatus. In this way, the temperature differential between the start of the supply conduit and end of the return conduit will be approximately the same ensuring uniform air flow through each enclosure.

The system may further comprise a source of nutrients and/or water and a supply means for circulating nutrients and/or water through the enclosures. The circulating means may comprise a water/nutrient supply conduit for supplying water and/or nutrient to the apparatus from a source of water and/or nutrient and return conduit for recovering water and/or nutrient from the apparatus and returning the water and/or nutrient to the source. The supply and/or return conduit may comprise a filter for filtering the water and/or nutrient as it is delivered to the apparatus or before it is returned to the source. In this way, any unused water and/or nutrient can be recycled for future use.

It will be understood that the terms "heated air" and "cooled air" are used herein to mean, respectively, air that is heated or cooled relative to the temperature of air in the environment external to the enclosure.

BRIEF DESCRIPTION OF THE DRAWINGS

Embodiments of the invention will now be described, by example only, with reference to the accompanying drawings, in which:—

DETAILED DESCRIPTION OF THE DRAWINGS

Figure 1:
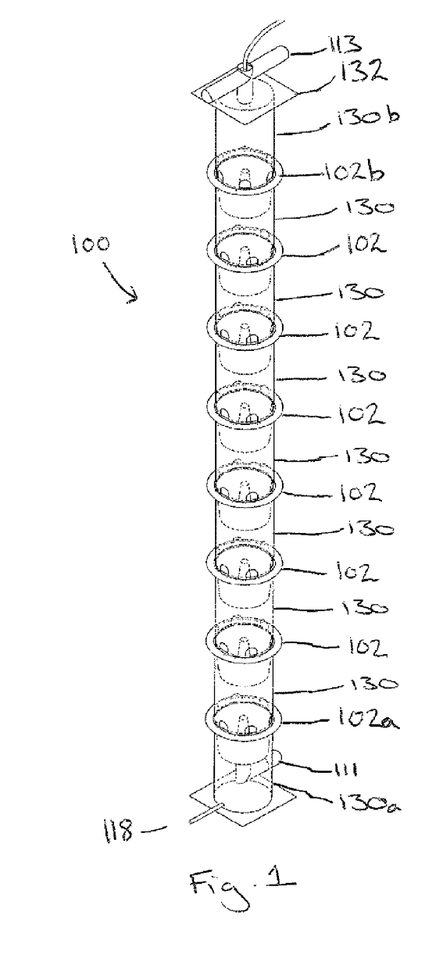
FIG. 1 is a perspective view of apparatus according to one embodiment of the invention.
Figure 2:
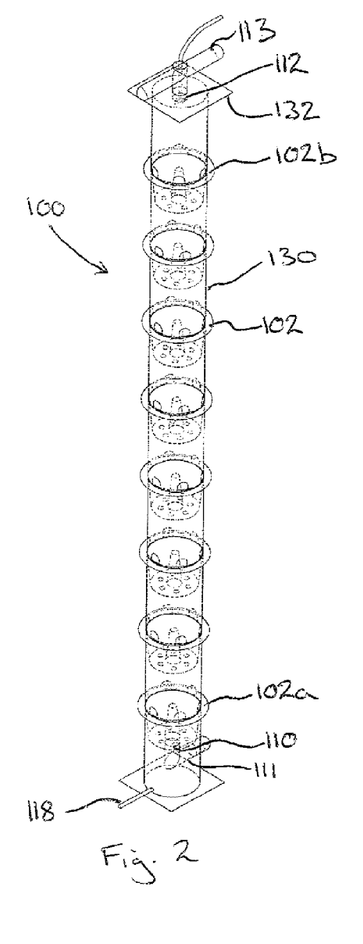
FIG. 2 is a perspective view of the apparatus with shadow lines illustrating parts of the apparatus that are obscured in FIG. 1.
Figure 3:
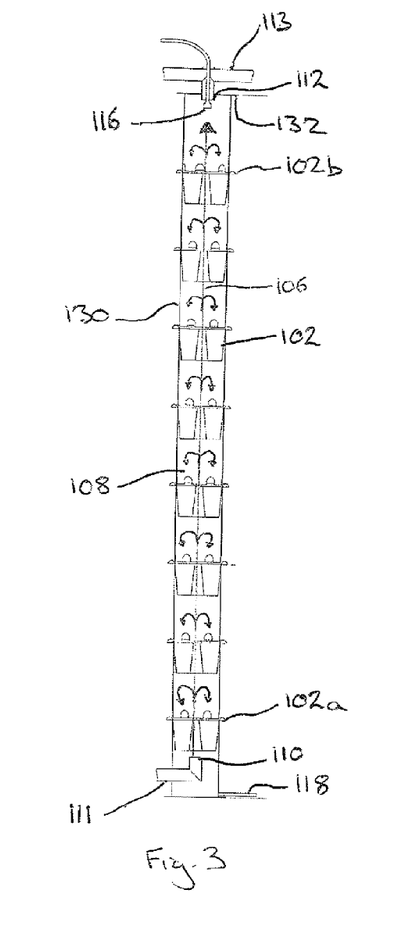
FIG. 3 is a cross-sectional view of the apparatus shown in the FIGS. 1 and 2.

Referring to FIGS. 1 to 3, apparatus for growing plants comprises a column 100 of plant pots 102 stacked one above the other to define an enclosure for housing plants. In this embodiment, each plant pot 102 is identical. However, it will be understood that in other embodiments, non-identical pots may be used. Each pot 102 defines a chamber 104 (shown in FIGS. 4 to 6) for holding a growing substrate, such as soil, rockwool, compost or biochar, in which the plant grows.

The column 100 has a passageway (indicated by arrows 106) providing a continuous flow path for air through the column 100. This flow path includes spaces 108 around tops of the pots 102 where plants project from the growing substrate. To flow along this path it is not necessary for the air to flow through the growing substrate in the chamber 104. In this embodiment air can flow through the passageway without flowing through the chamber.

The column 100 has an inlet 110 for receiving, in this embodiment heated air, and an outlet 112 for the removal of air from the column 100. The outlet 112 is located above the inlet 110, in this embodiment, the inlet 110 being located below the lowermost pot 102a and the outlet 112 located above the uppermost pot 102b. In this way, heated air introduced via the inlet 110 can rise through the passageway 106, heating the plants on the way, to the top of the column 100 where it is removed via the outlet 112.

The column 100 further comprises a water and nutrient inlet 116, in this case a spray head, connected to a water and nutrient source for introducing water and nutrients into the column 100. The water and nutrients percolate through the pots 102 to provide sustenance to the plants. Any excess water and/or nutrients that make it to the bottom of the column 100 are removed from the column 100 by drain 118.

Figure 4:
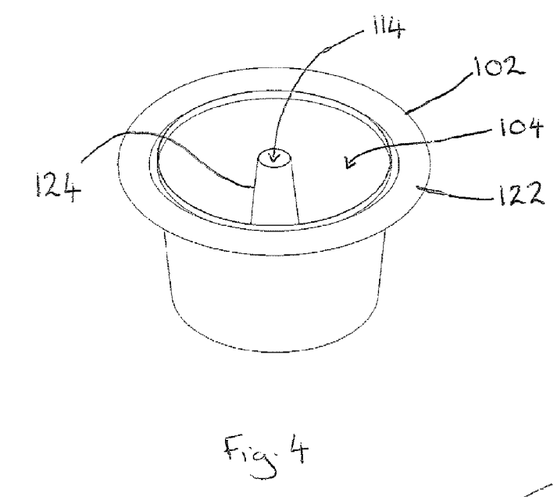
FIG. 4 is a perspective view of a plant pot used in the apparatus of FIGS. 1 to 3.
Figure 5:
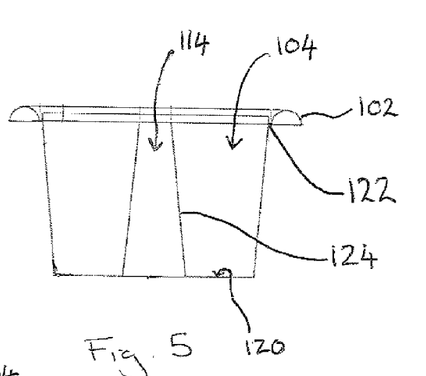
FIG. 5 is a cross-sectional view of the plant pot shown in FIG. 4.
Figure 6:
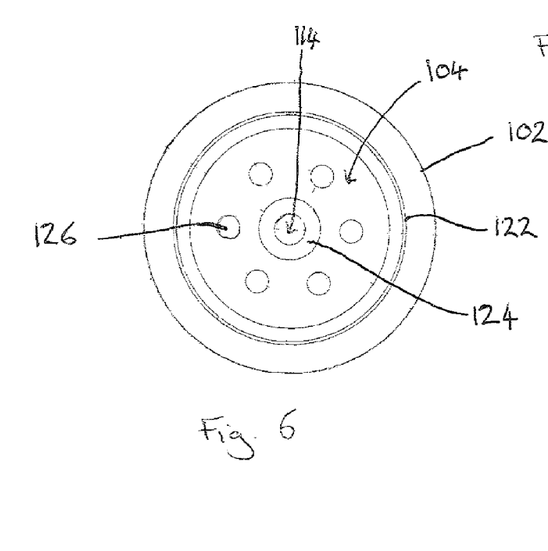
FIG. 6 is a plan view of the plant pot shown in FIGS. 4 and 5.

Now referring to FIGS. 4 to 6, each plant pot 102 has a duct 114 therein to form the passageway 106 through the column 100. The duct 114 is surrounded by the chamber 104 with inner tapered walls 124 separating the duct 114 from the chamber 104. In this embodiment, the duct 114 is located centrally and extends from a bottom 120 of the pot 102 to the same height as a downwardly curved rim 122 of the chamber 104. The pot has a height of around 100 mm and a diameter of around 150 mm plus the width of the rim of between 20 mm to 25 mm. The duct has a diameter at the bottom of around 40 mm and at the top of around 20 mm. The tapered shape of the duct 114 encourages water and nutrients that enter the duct 114 to flow away from the opening in the duct 114 of the pot 102 below. In this way, the duct 114 helps to prevent the flow of water and nutrients straight to the bottom of the column through the ducts 114.

A bottom of the chamber 104 has holes 126 therein to facilitate the percolation of the water and nutrients through the column 100.

Figure 7:
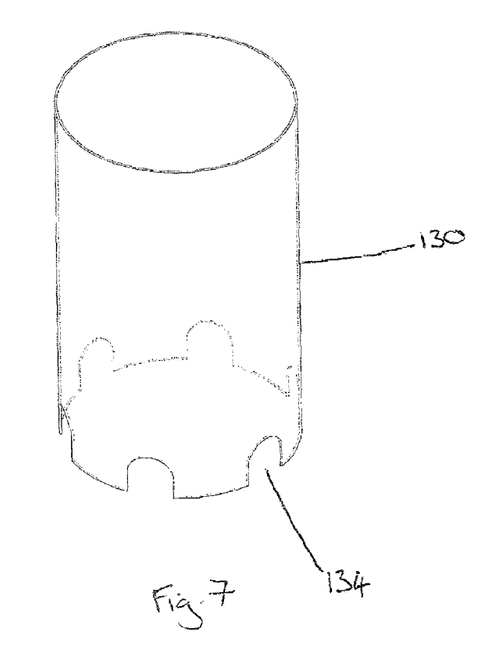
FIG. 7 is a perspective view of a separator used in the apparatus of FIGS. 1 to 3.
Figures 8, 9:
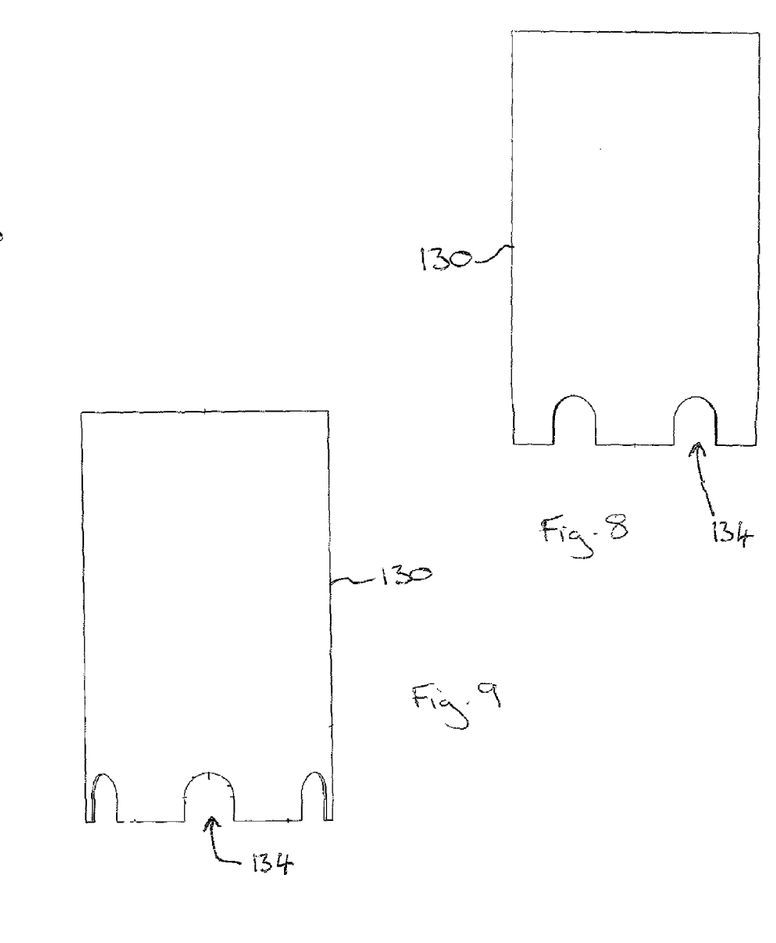
FIG. 8 is a side view of the separator shown in FIG. 7.
FIG. 9 is a side view of the separator shown in FIGS. 7 and 8 from an alternative direction to that of FIG. 8.

Now referring to FIGS. 1 to 3 and 7 to 9, the column 100 may further comprise transparent or translucent separators 130 for separating pots 102 of the column 100. In this embodiment, a separator 130 is provided between each pair of pots 102. The separators 130 between the pots are identical (these type of separators are shown in FIGS. 7 to 9). However, separators 130a and 130b are different from the other separators 130. Separator 130a has appropriate openings for receiving an air inlet pipe 111 and the drain 118. Separator 130b has a cover 132 for closing a top of separator 130b and for retaining an air outlet pipe 113.

The separators 130 provide a headspace between the pots 102 for the plants to grow and allow sunlight into the column 100. In this embodiment, each separator has a height of around 200 mm and a diameter of around 150 mm. The height of the headspace for plant growth will therefore be around 150 mm. Columns 100 having a headspace of this size may be suitable for growing plants such as salad crops, lettuces, tomatoes, strawberries, peas, beans, herbs, chillies, peppers and the like. The size of the headspace that is required may depend on the size and form of the plant being grown, for example foliage size, fruit size, vine or bush. Ideally, enough space is provided to allow the foliage to grow in an unrestricted manner. On the flip side, ideally the space is not to be unnecessarily large since more energy may then be required to maintain a desired temperature (e.g. to avoid heat loss or heat gain). It has been found that a separator of 200 mm height is suitable for a good range of plants. Smaller or larger separators might be provided depending upon application, e.g. for larger plants, saplings, very large crop species, the separators might be about 1 m in height. The location of the system and available sunlight will also impact upon the size of the headspace. The less light that is available, the greater the headspace may need to be. In other embodiments the separators may be about 250 mm in height or any other suitable height.

In this embodiment, each separator 130 is a hollow cylinder of transparent or translucent material having a continuous upper edge for engaging with an underside of rim 122 of the pot 102 when assembled into a column 100. A bottom portion of the separator comprises apertures. In this embodiment the apertures are circumferentially spaced open sided apertures 134. Thus, when the separator is assembled into the column, there is a series of gaps between the pots 102 and the separators 130 through which plants can grow out from the column 100. In this embodiment, six arch shaped apertures 134 are provided, each aperture 134 having a height at the apex of around 30 mm and a width of around 30 mm. Accordingly, the percentage of the area surrounding the headspace that is closed by the separator 130 (i.e. rather than open to the external environment via apertures 134) may be more than 90% and in this embodiment, more than 93%. It might be more than 95% in some embodiments. In this way, loss of energy through escape of heated air to the external environment is kept sufficiently low.

The curved rim 122 of the pot 102 helps to prevent damage to portions of the plant projecting from the apertures 134.

When assembled into the column 100, each pot 102 can be rotated about its centre such that the user can access the plants as desired.

When assembled into the column 100, each pot 102 can be rotated about its centre such that the user can access the plants as desired.

Figure 10:
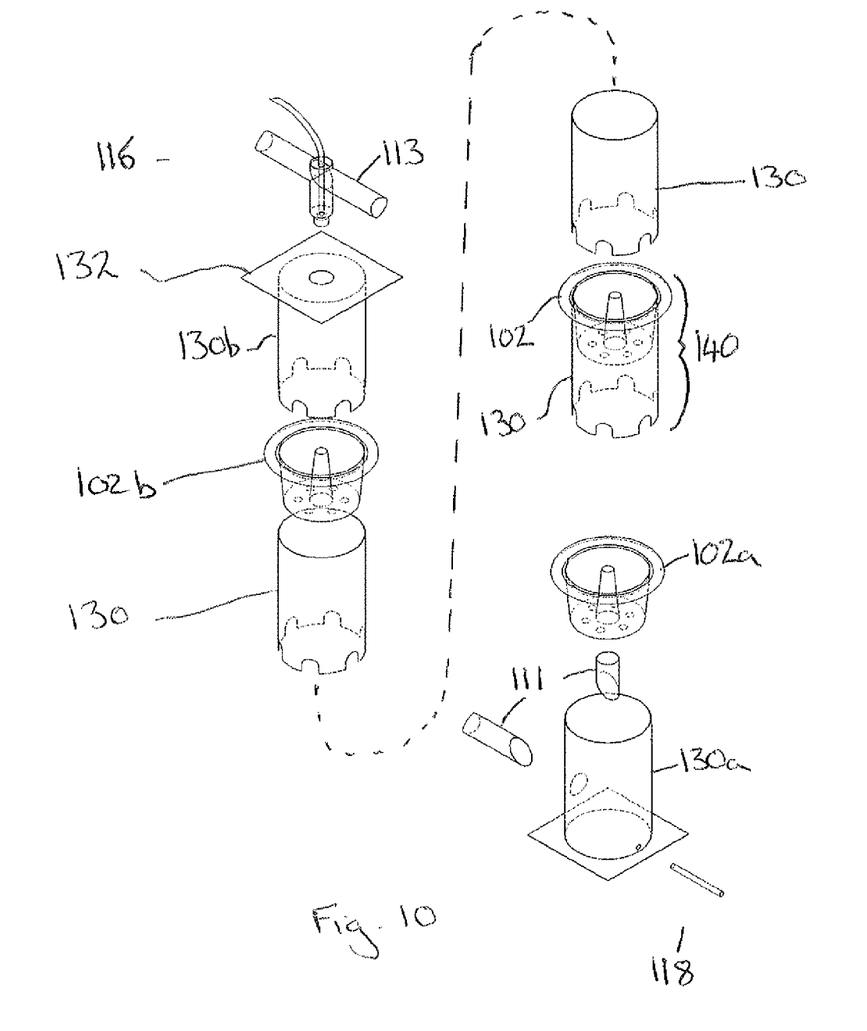
FIG. 10 is an exploded perspective view of the apparatus shown in FIGS. 1 to 3 showing the kit of parts that are assembled together to form the apparatus.

FIG. 10 shows the different parts that are assembled together to form the column 100 (the dotted lines illustrate that not all of the pots and separators are shown). It will be understood that these parts can be provided as a kit of parts to be assembled on site. Furthermore, it will be understood that pot and separator pairs 140 may be supplied as a module separate from the rest of kit to add to an existing column 100 or to replace a module of an existing column.

Figure 11:
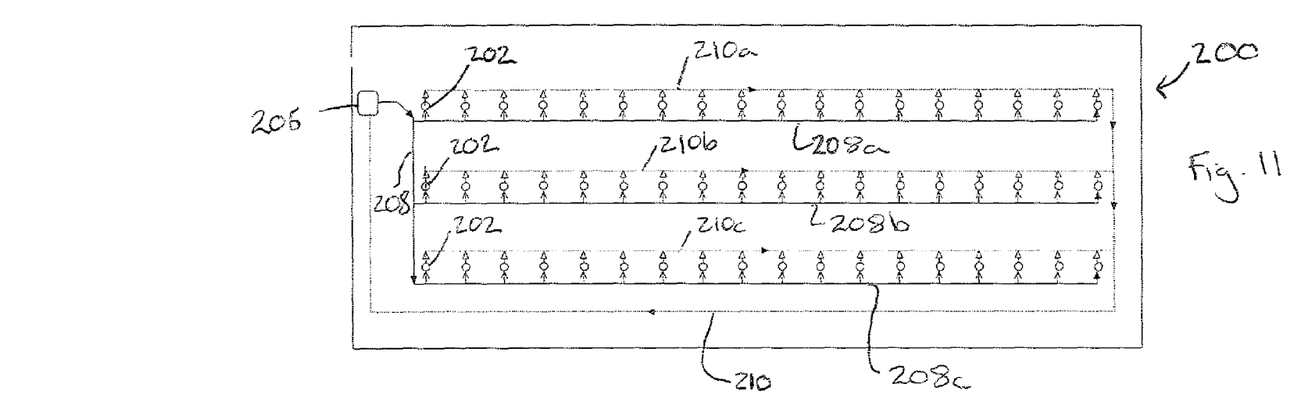
FIG. 11 is schematic diagram of an air circulation arrangement of a system according to one embodiment of the invention.
Figure 12:
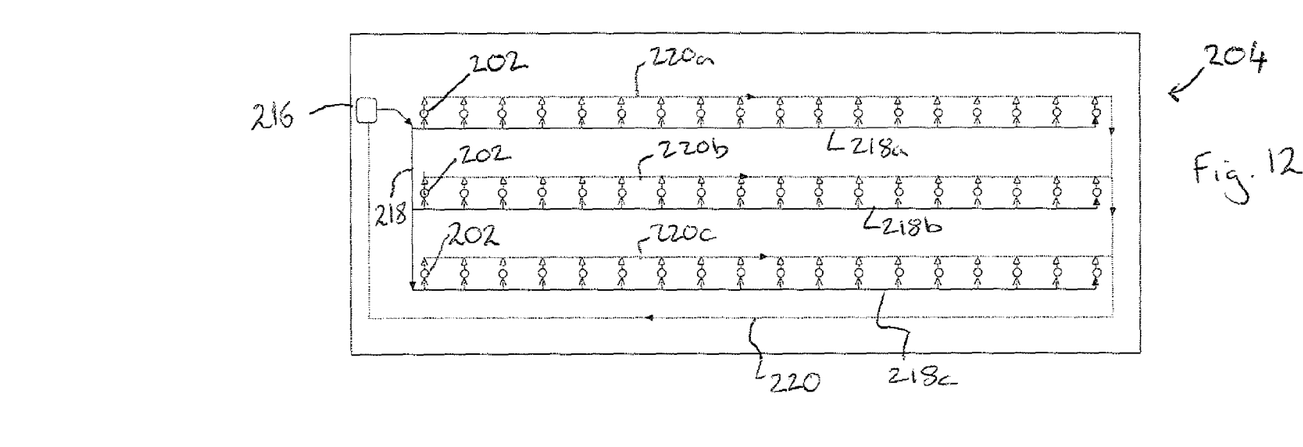
FIG. 12 is a schematic diagram of a water and nutrient circulation arrangement of the system.

Referring to FIGS. 11 and 12, the apparatus of FIGS. 1 to 10 can be incorporated into a system as shown in FIGS. 11 and 12 for providing heated air, water and nutrients to plants. The system comprises a plurality of enclosures 202 containing plants, typically arranged in a series of rows, and two recirculation arrangements, one arrangement 200 for circulating air through the enclosures 202 to maintain the plants at the required temperature and another arrangement 204 for circulating water and nutrients through the enclosures 202. Each enclosure 202 comprises apparatus as shown in FIGS. 1 to 10.

Arrangement 200 for the recirculation of air comprises a heat exchanger 206 for heating air that passes therethrough, a supply conduit 208 (shown in solid lines) for supplying the heated air from the heat exchanger 206 to air inlets at the bottom of the apparatus 202 and a return conduit 210 (shown in dotted lines) for recovering air from air outlets at the top of the enclosures to the heat exchanger 206. In this embodiment, the supply conduit 208 splits into separate lines 208a, 208b, 208c for each row of apparatus 202 and the return conduit has separate lines 210a, 210b, 210c for receiving air from each row of apparatus 202. In use, the plants in the apparatus 202 are maintained at the required temperature by heating air with heat exchanger 206 and then passing this heated air into the enclosures. The warm/hot air rises to the top of the apparatus though convection, the apparatus channeling the rising air pass the plants therein. The air that has passed through the apparatus 202 is recovered by the return line 210 to the heat exchanger 206 to be reheated and used again.

The heating of air by the heat exchanger 206 may be thermostatically controlled to keep the plants at a steady temperature. The flow of air through the system may be achieved through the temperature differential either side of the heat exchanger 206. Alternatively, a pump or fan may be provided for circulating the heated air.

Attaching the columns 100 of apparatus 202 to the pipe work of conduits 210a, 210b, 210c stabilises the columns 100.

Arrangement 204 for the recirculation of water and nutrients comprises a source, such as a tank, of water and nutrients 216, a supply conduit 218 (shown in solid lines) for supplying the water and nutrients from the source 216 to water inlets at the top of the apparatus 202 and a return conduit 220 (shown in dotted lines) for recovering water and nutrients from a drain at the bottom of the apparatus 202. The recovered water and nutrients may be filtered before being supplied back to the water and nutrient tank 216. In this embodiment, the supply conduit 218 splits into separate lines 218a, 218b, 218c for each row of apparatus 202 and the return conduit has separate lines 220a, 220b, 220c for receiving water and nutrients from each row of apparatus 202.

In this embodiment, for both the air recirculation arrangement 200 and the water and nutrient recirculation arrangement 204, a length of the supply conduit 208, 218 from the heater exchanger 206/water and nutrient tank 216 to the apparatus 202 plus the length of the return conduit 210, 220 from the apparatus 202 to the heater exchanger 206/water and nutrient tank 216 is substantially the same for each apparatus 202. For example, for an apparatus 202 having a short supply conduit 208, 218 from the heat exchanger 206/tank 216 there will be a long return conduit 210, 220 to the heat exchanger 206/tank 216.

A system according to the above described embodiment may be advantageous as heated air can be introduced into each column 100 to flow substantially unimpeded around the plants for aiding plant growth whilst the apparatus limits loss of the heated air to the outside environment as it flows through the column. Furthermore, the volume of air that needs to be heated is reduced because of the small volume of the enclosed space defined by the columns 100. In this way, the environment for the plants can be controlled in an energy efficient manner. Furthermore, it is believed the flow of air over the leaves, stems, surface of the growth substrate, and/or the propagation plug (peat, or similar substrate) enclosing the stems, roots, bulb, or shoots of the plant, and/or surfaces of the apparatus may help to reduce fungal, algal and bacterial growth.

It will be understood that alterations and modifications can be made to the above described embodiment without departing from the invention as defined herein. For example, the ducts through the pots may be provided in a different region of the pot, for example by open channels in the sides of the pot. The height of each separator may be different depending on the plants being grown. Use of appropriately sized separators ensures that the space for growing plants is efficiently utilized.

A lower surface of each pot 102 may be shaped to cause water thereon to run away from the passageway 106 in the column 100. For example, the lower surface of each pot may be sloped downwardly in a radial direction away from a centre of the pot 102. In this way, water that condenses on the bottom of the pot 102 and water that percolates through the holes 126 in the pot 102 is drawn away from the centre of the column 100 limiting the amount of water that passes straight through passageway 106 to the bottom of the column 100.

The plants in each pot may be sprayed directly with water and nutrients rather than fed by the percolation of water and nutrients through the pot above. For example, a pot specific sprayer may be connected to a water/nutrient tube running through the air ducts in the pots.

In the system comprising a plurality of apparatus, the temperature of the air delivered to different apparatus 202 can be controlled separately. In this way, different types of plants having different temperature requirements can be grown in the system. Furthermore, water and nutrient may be provided from separate tanks. The system may be arranged such that water can be delivered to the apparatus 202 without nutrient and mixed with the nutrient to provide a solution. The system may be arranged to provide different solutions to different apparatus, allowing different types of crops that require different solutions to be grown within a single system.

To increase the size of the headspace more than one separator may be used between each plant pot. To achieve this, an attachment element that is not a plant pot may be provided to attach the consecutively stacked separators together.

One or more of the pots may be shaped such that a portion, a so called ear, of the chamber of the pot lies outside the periphery of the separator. This may be an alternative to providing apertures in the separator. In such an arrangement, the plant can grow out of the enclosure via the ear. A pot may comprise a plurality of ears circumferentially spaced around the pot.

The invention provides a suitably sized enclosure for ensuring plants have enough space to grow, but which is not too large, thus avoiding wasting energy. The enclosure is substantially insulated from the environment, and so unintended heat loss or heat gain, and water loss is minimised. An air flow path is provided, which path is not required to pass through the chamber of the pot, in which a growth substrate might usually be present. In this way, the invention ensures that the interior surfaces of the enclosure and the upper surfaces of the substrate are able to have air flowing past them, whilst still efficiently maintaining a temperature and water controlled environment. Usually this air flow is achieved by exposing the substrate surface to the external environment, in which case a large amount of heat and water transfer occurs to the environment. Or, this might usually be achieved in a large greenhouse—type arrangement in which case a lot of energy is spent in controlling the environment to achieve suitable air flow paths. In contrast the present invention provides both an efficient, controlled environment and an air flow path. The controlled, aerated enclosure is only as large as it needs to be. Mechanisms are provided to allow the growing plant to grow outside the enclosure if necessary, whilst importantly, the propagation plug or roots or stems of the plant are maintained in the controlled environment.

This invention provides aeration and a controlled environment for the portion of the substrate in which the plant's roots are located and from which the plant's stems, leaves and foliage extend. This portion needs to be aerated, but in the prior art, this is only achieved by exposing the portion of the surface of the substrate from which the plant foliage grows to the outside environment. This results in excessive heat and moisture transfer between this portion of the substrate and the uncontrolled external environment. In this invention, this portion of the substrate is within the enclosure and is not exposed to the outside environment in the same way.

In the described embodiments, this vertical growing system with lateral apertures allows the growing of plants which are conventionally grown horizontally in a space-efficient vertical manner. This is beneficial relative to other systems in which laterally extending pots are provided extending from a central region, and in which the pots have exposed soil (or other substrate) from which the plant grows. There is a space saving, and an avoidance of (excessive) heat/temperature transfer from the substrate.

In some embodiments, the cylindrical separator 130 is formed of two (hollow semi-cylindrical) pieces. These pieces may be made of a flexible plastic material, and may link together to form a suitable separator (i.e. capable of forming an enclosure) via a tongue and groove friction fit arrangement.

In some embodiments, in use, the plant to be grown is in the form of a shoot or bulb, or is enclosed in a peat plug. The shoots, roots bulb or plug is placed within the chamber (e.g. on the surface of the substrate (e.g. soil)) then the separator is connected to the pot such that the apertures of the separator are aligned with the shoots, roots, bulb or plug so that growth of the plant out of the chamber via the aperture is encouraged.

Another optional feature of some embodiments of the apertures is the provision of an aperture seal. The aperture seal comprises a closure for the aperture(s) in order to minimise heat and water transfer between the enclosure and the external environment. The aperture seal might take the form of a rubber or paper member to be located or fixed at the aperture to close the aperture whilst flexibly allowing a shoot of a plant to pass therethrough, for example by means of a slit in the rubber/paper material.

In this way the shoot can initially be positioned to pass through the aperture seal and can change in position within the aperture as it grows, whilst the remainder of the aperture is effectively closed.

The invention claimed is:

1. An apparatus for growing plants, comprising:
a column of plant pots stacked one above the other to define an enclosure for housing plants each pot defining a chamber configured to hold a plant, the chamber having a bottom, wherein the chamber is configured to hold a growing substrate in which the plant grows, and wherein further the bottom of the chamber has holes therein; and
a plurality of separators positioned between adjacent plant pots such that each plant pot is vertically spaced from each adjacent plant pot and at least one plant pot is partially nested within at least one separator, wherein each separator comprises a hollow cylinder having a continuous upper edge for engaging an underside of a rim of one of said plant pots and a non-continuous lower edge for engaging an upper side of a rim of one of said adjacent plant pots,
each of the plurality of separators define an enclosed headspace around a top of each of at least two of the pots where plants project from the chamber, and
each pot in the column of pots comprises a duct that forms a passageway providing a continuous flow path for air through the column of pots without requiring the air to flow through the chamber of each pot, the flow path comprising the headspaces above the at least two pots.

2. The apparatus according to claim 1, wherein the column comprises an inlet configured to receive air and an outlet configured to remove air from the column.

3. The apparatus according to claim 2, wherein the received air comprises heated or cooled air.

4. The apparatus according to claim 2, wherein the outlet is located above the inlet.

5. The apparatus according to claim 4, wherein the inlet is located below the lowermost pot and the outlet is located above the uppermost pot.

6. The apparatus according to claim 1, wherein the chamber is configured to hold a growing substrate in which the plant grows, and the duct extends from a bottom of the pot to a location above an intended top of the growth substrate.

7. The apparatus according to claim 1, wherein the duct extends at least to a height of a rim of the chamber.

8. The apparatus according to claim 1, wherein the duct is surrounded by the chamber with inner walls separating the duct from the chamber.

9. The apparatus according to claim 1, wherein the separators are separate from the pots.

10. The apparatus according to claim 1, wherein the separators are transparent or translucent.

11. The apparatus according to claim 1, wherein at least one separator comprises apertures therein through which plants can grow out from the column, and optionally wherein the apertures comprise less than 10% of the area of the separator, and optionally less than 7%, and further optionally less than 5%.

12. The apparatus according to claim 11, wherein each pot immediately below the at least one separator comprising apertures comprises a curved rim.

13. The apparatus according to claim 1, wherein the column of pots is configured such that water evaporating from a plant and/or the growing substrate in one of the pots will condense on one of the pots above and a lower surface of each pot is shaped to cause water condensed thereon to run away from the passageway in the column.

14. The apparatus according to claim 13, wherein each pot comprises a central duct therein and the lower surface of each pot slopes downwardly in a radial direction away from a center of the pot.

* * * * *